United States Patent
Hossain et al.

(10) Patent No.: US 7,835,335 B2
(45) Date of Patent: *Nov. 16, 2010

(54) OPTIMIZED DATA RECONNECT

(75) Inventors: Asif Hossain, Kanata (CA); Muhammad Khaledul Islam, Kanata (CA); Jin Kim, Ottawa (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/435,765

(22) Filed: May 5, 2009

(65) Prior Publication Data
US 2009/0238146 A1  Sep. 24, 2009

Related U.S. Application Data

(63) Continuation of application No. 10/747,979, filed on Dec. 29, 2003, now Pat. No. 7,539,170.

(51) Int. Cl.
*H04Q 7/24* (2006.01)
*H04Q 7/20* (2006.01)

(52) U.S. Cl. .................. 370/338; 455/440; 455/422.1

(58) Field of Classification Search .......... None
See application file for complete search history.

(56) References Cited

U.S. PATENT DOCUMENTS

| | | |
|---|---|---|
| 4,394,778 A | 7/1983 | Ikeguchi et al. |
| 4,613,990 A | 9/1986 | Halpern |
| 5,119,502 A | 6/1992 | Kallin et al. |
| 5,513,388 A | 4/1996 | Suganuma |
| 5,722,053 A | 2/1998 | Kornfeld et al. |
| 5,828,661 A | 10/1998 | Weaver et al. |
| 5,903,238 A | 5/1999 | Sokat et al. |
| 5,982,758 A | 11/1999 | Hamdy |
| 5,991,622 A | 11/1999 | Henry, Jr. |
| 6,011,781 A | 1/2000 | Bell |
| 6,216,004 B1 | 4/2001 | Tiedemann et al. |
| 6,542,476 B1 | 4/2003 | Elizondo et al. |
| 2004/0127191 A1 | 7/2004 | Matsunaga |

*Primary Examiner*—Ayaz R Sheikh
*Assistant Examiner*—Blanche Wong
(74) *Attorney, Agent, or Firm*—Jones Day; Krishna K. Pathiyal; Robert C. Liang

(57) ABSTRACT

A method of optimizing reconnection of a point to point protocol link layer in a mobile device comprising the steps of: monitoring whether the mobile device has entered a new zone; starting a stabilization period when the mobile device enters a new zone; checking whether the mobile device enters a different zone during the stabilization period; if the mobile device enters a different zone during the stabilization period, restarting the stabilization period and performing the checking step; and if the mobile device does not enter a new zone during the stabilization period, determining whether the mobile device is in a new zone, reconnecting to the new zone if the mobile device is in the new zone, and otherwise performing no reconnection.

22 Claims, 4 Drawing Sheets

OPTIMIZED DATA RECONNECT

This is a continuation of U.S. application Ser. No. 10/747,979, filed on Dec. 29, 2003 now U.S. Pat. No. 7,539,170.

FIELD OF THE INVENTION

The present invention relates to a method and apparatus for reducing repeated point-to-point protocol (PPP) reconnections of dormant data service.

BACKGROUND TO THE INVENTION

The point-to-point protocol (PPP) provides a standard method for transporting multi-protocol datagrams over point-to-point links. A mobile station needs to maintain PPP connectivity while the mobile station is providing seamless data connectivity in a mobile environment. Once the mobile station has established a PPP session and is assigned an IP address, its data service enters dormant state when it has no data to send or receive. In such conditions, mobile station monitors change in network parameters in order to determine whether it needs to reconnect its data service in order to maintain PPP connectivity. In a CDMA network, whenever the mobile station detects changes in certain network parameters such as the System ID (SID) or Network ID (NID) or a new packet zone identifier, the mobile station needs to re-establish the PPP link layer pursuant to the IS-707 standard. The reconnection attempt may include sending a message on the control channel or making a data call on dedicated traffic channel.

In certain scenarios, when the mobile station is in a boundary area, it may move back and forth between two SIDs/NIDs and be required to perform repeated PPP reconnections. If the network does not expressly provide the number of packet zone identifiers that the mobile station is to keep, then the mobile station only maintains one entry for the packet zone and in such cases, a similar ping-pong scenario would happen between two packet zone boundaries.

Even when the mobile station is stationary in a border area, it is possible that the mobile station could ping-pong between two boundary areas due to the fluctuations in radio frequency coverage.

Under such circumstances, the mobile station continually makes data calls in order to reconnect its packet data service. This results in wasting valuable battery life as well as causing an extra burden on network resources.

SUMMARY OF THE INVENTION

The present invention overcomes the deficiencies in the prior art by providing a method and system for optimizing data reconnection. Specifically, the present invention provides a stabilization period for a mobile station within which the mobile station will refrain from performing a data reconnect. The present invention adds intelligence to the mobile station to detect a ping-pong scenario and once this scenario is detected, the mobile station waits for a stabilization period. After the stabilization period is over, the mobile station verifies whether it has come back to the same zone that it started in, in which case it will not perform a reconnect. The term "zone" is used to describe a network with at least one parameter out of SID, NID and Packet Zone Identifier, which is unique to it. Conversely, if after the stabilization period is over the mobile station finds itself in a new zone, it performs a data reconnect at that time.

The present invention further contemplates several safeguards to ensure stabilization occurs and that a PPP session is maintained. These include a stabilization counter, a max return counter, and a countdown timer which may be used independently or in conjunction with each other.

The introduction of a stabilization period provides the advantage that considerable improvement in battery life can be achieved if the mobile station resides in a SID/NID/Packet Zone Identifier border area. Further, the drain on system resources is reduced.

The present invention therefore provides a method of optimizing reconnection of a point to point protocol link layer in a mobile device comprising the steps of: monitoring whether the mobile device has entered a new zone; starting a stabilization period when the mobile device enters a new zone; checking whether the mobile device enters a different zone during the stabilization period; if the mobile device enters a different zone during the stabilization period, restarting the stabilization period and performing said checking step; and if the mobile device does not enter a new zone during the stabilization period, determining whether the mobile device is in a new zone, reconnecting to the new zone if the mobile device is in the new zone, and otherwise performing no reconnection.

BRIEF DESCRIPTION OF THE DRAWINGS

The present invention will be understood with reference to the drawings, in which.

DETAILED DESCRIPTION OF THE INVENTION

Reference is now made to the drawings.

Figure 1:
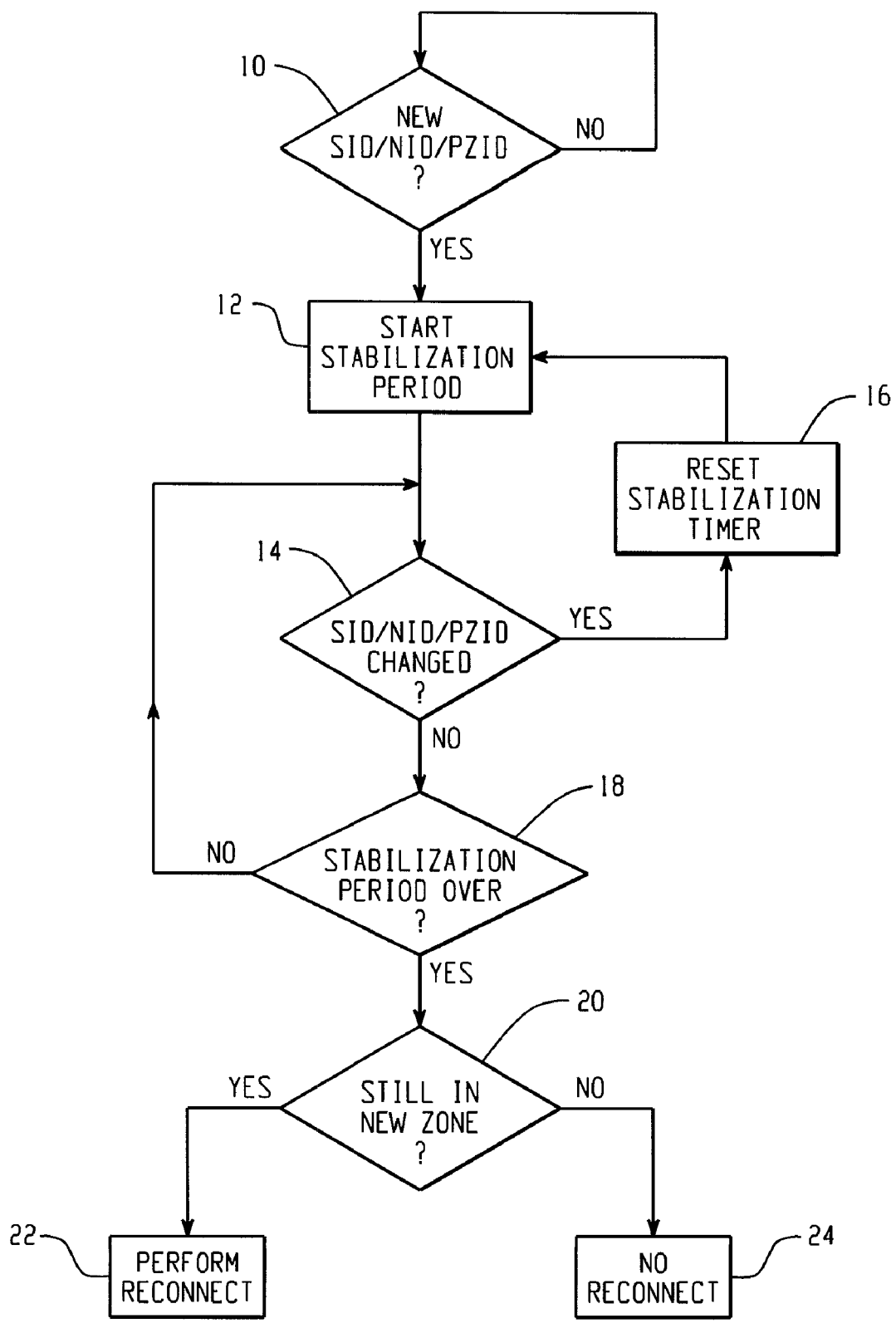
FIG. 1 is a flow diagram of a first embodiment of the present invention.

In a first embodiment of the invention, as illustrated in FIG. 1, a mobile device monitors whether or not it has entered a zone, as identified by a new system ID (SID), network ID (NID), or packet zone ID (PZID). In order to maintain network connectivity, upon entering a new zone a reconnection of the point-to-point protocol would be required. However, as indicated above, frequent reconnects when in the boundary area can drain battery life and tie up network resources. In order to overcome this deficiency, the present invention monitors whether or not it has moved into a new zone in step 10. If no new zone has been entered, the system of the present invention stays in step 10.

Once a new zone has been detected, the system of the present invention moves to step 12. In step 12, a stabilization period is started by starting a stabilization timer. The duration of the stabilization period can be determined from field tests and may be any value. In practice it has been found that an optimized stabilization period is in the order of less than a minute to a minute.

Once the stabilization timer has been started in step 12, the system moves to step 14. In step 14, the system of the present invention queries whether the SID, NID or PZID have changed. This would indicate that the device has moved into a new zone and therefore is not stable. If the system detects that the zone has changed, the system of the present invention moves to step 16 in which the stabilization timer is reset and then back to step 12 in which the stabilization period is restarted.

Conversely, if the present invention finds in step 14 that the SID, NID or PZID have not changed, the system moves to step 18. In step 18, the system checks to see whether or not the stabilization period is over. The stabilization period is over if the stabilization timer has expired.

If the stabilization period is not over, the system of the present invention moves back to step 14 in which it checks whether the zone has changed and continues to loop with step 18 to check whether the stabilization period is over.

If the stabilization period in step 18 has expired, the system of the present invention moves to step 20. In step 20, the system checks whether it is within a new zone or whether it is within an original zone. If in step 20 it is determined that the system is in a new zone, the system of the present invention moves to step 22 in which a reconnection is performed to establish a new PPP connection. Conversely, if the system of the present invention is in the original zone it started in, then no reconnection is necessary and the system moves to step 24.

The advantage to the above, as will be seen by one skilled in the art, is that a stabilization period is provided which allows the device not to reconnect if the SID, NID or PZID relative to current zone has not changed for this stabilization period. This eliminates repeated reconnections due to a ping pong scenario at a boundary area.

Figure 2:
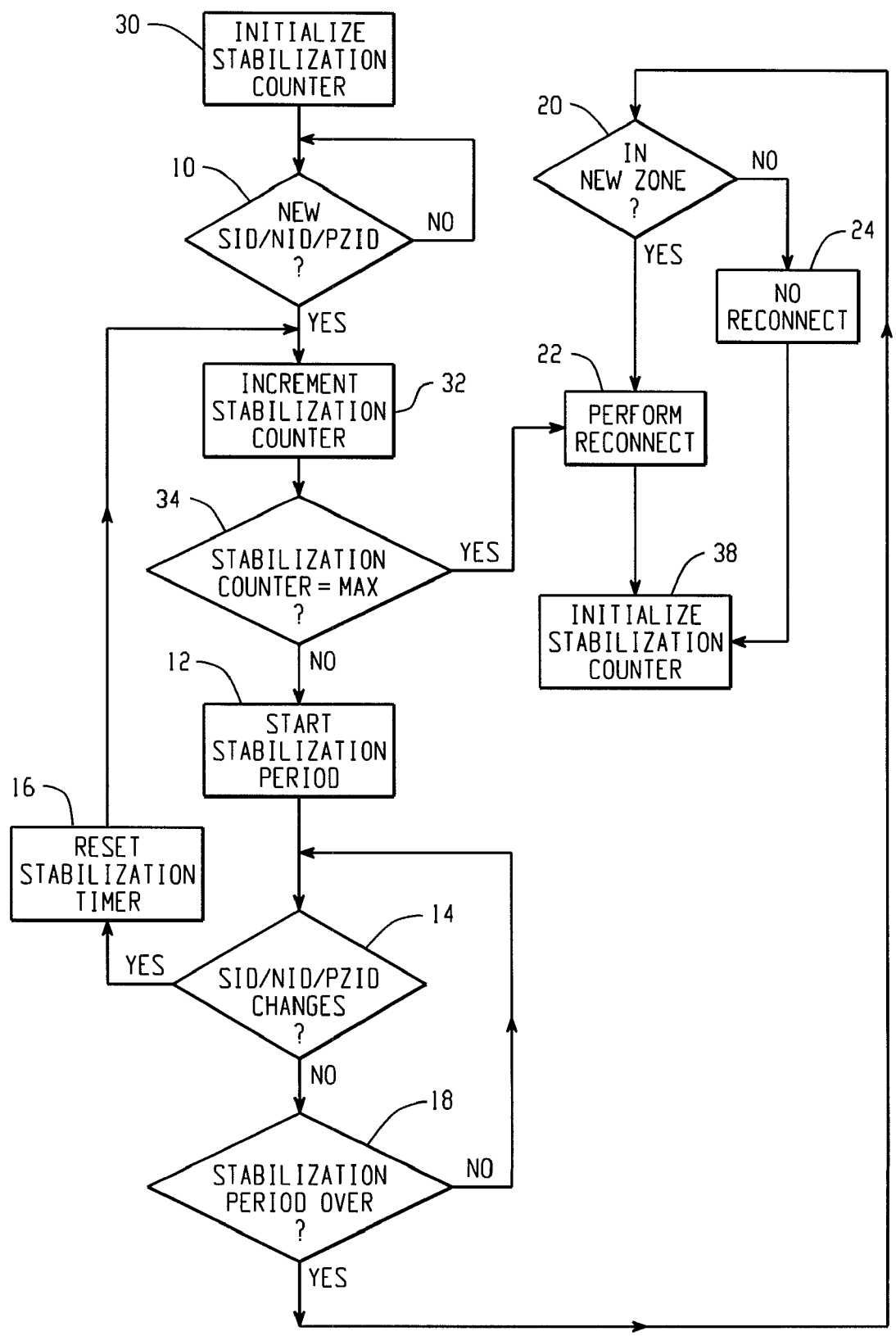
FIG. 2 is a flow diagram of an alternative embodiment to the present invention in which a timer restart counter has been added.

A further enhancement to the system of FIG. 1 is described in the embodiment of FIG. 2. In FIG. 1, it is possible that stabilization is never achieved. If the mobile device is in a boundary area and detects a different zone within the stabilization period, this causes the stabilization period to be reset. In one scenario the device will always detect another zone within the stabilization time, and thus continually be within a stabilization period and never stabilized.

Reference is now made to FIG. 2. In order to overcome the above, the embodiment of FIG. 2 introduces a stabilization counter to limit the number of times the device can move between zones. Once the stabilization counter reaches a threshold or a pre-configured maximum value, the mobile device must perform a reconnection regardless of whether stabilization has occurred.

The system in FIG. 2 starts by initializing the stabilization counter in step 30. The system next moves to step 10 in which the system checks whether or not the mobile device has entered into a new zone and, if it has not, it stays in step 10.

Once the system of the present invention detects that it has moved into a new zone, the system moves to step 32 where the stabilization counter is incremented. The system next moves to step 34. In step 34, the system checks to see whether the stabilization counter has reached a maximum value.

If the stabilization counter has reached a maximum value, the system moves to step 22 in which a reconnection is performed and then moves to step 38 in order to initialize the stabilization counter.

Conversely, if the stabilization counter has not reached a maximum in step 34, the system next moves to step 12 in which a stabilization period is started by setting a stabilization timer. The system next moves to step 14 in which it checks to see whether the SID/NID/PZID has changed.

If the zone has changed in step 14, the system resets the stabilization timer in step 16 and further moves back to step 32 in which the stabilization counter is again incremented and again in step 34 the stabilization counter checks to see whether the maximum has been reached.

If in step 14 the system finds that the zone has not changed, it checks in step 18 whether the stabilization period is over. If the stabilization period is not over, then the system continues to check whether the zone has changed in step 14 and whether the stabilization period is over in step 18.

Once the stabilization period is over in step 18, the system next moves to step 20 in which the system checks whether it is in a new zone. If the system is in the original zone that it started in, it does not need to perform a reconnection and moves to step 24. Conversely, if the system is in a new zone, then a reconnection is required and the system moves to step 22.

After steps 22 and 24, the system next in step 38 initializes the stabilization counter in order to ensure the stabilization counter is at a value required if the system moves into a new zone and the system of FIG. 2 needs to be restarted.

Based on the above, the system of FIG. 2 only allows the movement between different zones a maximum number of times after which a reconnection is performed regardless of whether stabilization has been achieved. This presents the advantage that the system is never permanently stuck in a loop waiting for stabilization to occur.

Figure 3:
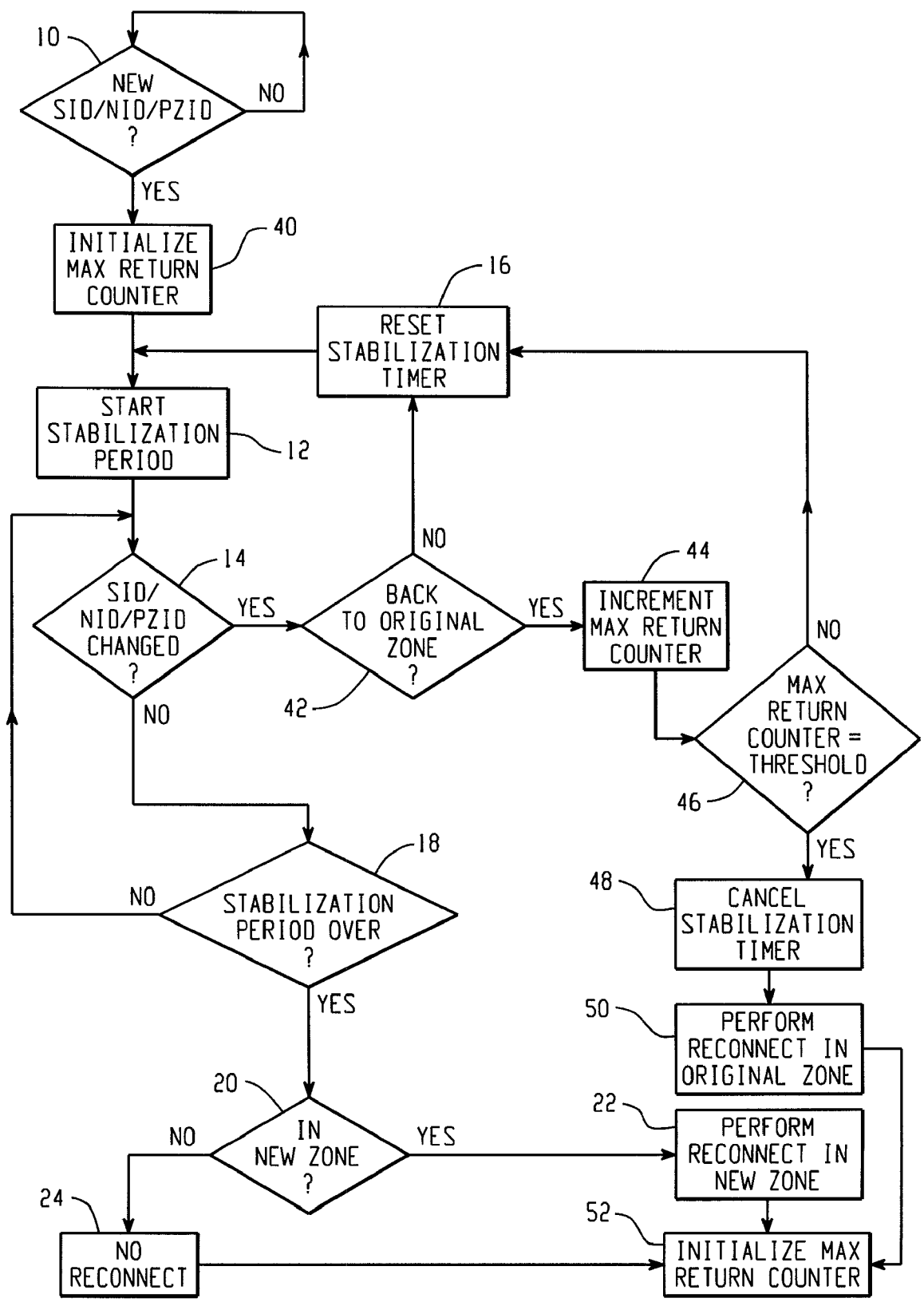
FIG. 3 is a flow diagram of an alternative embodiment of the present invention in which a max return counter has been added.

A further alternate embodiment to the present invention is illustrated in FIG. 3. It is possible that in some networks, while the mobile device is in the process of waiting for the stabilization period to end before performing a data reconnect in the new system, it may be paged in the original system by the network for an incoming data call. This can be, for example, e-mail, a voice over IP incoming call, or other types of incoming data calls known to those skilled in the art.

The network may drop the PPP session in the original system if the mobile device does not respond in the original system. The mobile device could be completely unaware of this and after the stabilization period is over, if the mobile device has returned to the original system as described above, it will not perform a data reconnect with this original system. As such, the mobile device would not receive packet data until the next time that the mobile device re-establishes connection with the PPP session. This absence of a PPP session is not desirable in an always-on device.

In order to improve the probability of maintaining data connectivity in any similar situation as described above, the mobile could make use of a counter to achieve optimal connectivity. This counter will be referred to below as the max return counter.

In FIG. 3, the mobile device waits in a state 10 until it receives an indication that it has moved into a different zone based on the system ID, network ID, or packet zone ID.

Once the system moves into a new zone, it moves to step 40 in which the max return counter is initialized. The system then moves to step 12 in which the stabilization period is started.

Once the stabilization period has started, the system checks to see whether the system ID, network ID, or packet zone ID has changed, indicating that it has moved into a different zone in step 14. If it has not moved into a new zone, the system next moves to step 18 in which it checks to see whether the stabilization period is over and, if the stabilization period is not over, the system moves back to step 14 where it checks for a new zone and step 18 where it checks to see whether the stabilization period is over.

If the zone has been found to have changed in step 14, the system next moves to step 42. In step 42, the system checks to see whether it is back in the original zone it started in. If it is not back in its original zone, the system next moves to step 16 in which the stabilization timer is stopped and the stabilization period is started again in step 12.

Conversely, if in step 42 it is determined that the system is back in the original zone, the system moves to step 44. In step 44, the max return counter is incremented and the system next moves to step 46. In step 46, the system checks to see whether the max return counter has met a threshold value. This threshold value can be determined based on the criteria for optimizing the maintenance of network connectivity as will be appreciated by one skilled in the art.

If the system has not reached the max return counter threshold, the system moves to step 16 in which the stabilization timer is reset and the stabilization period is started again.

Conversely, if the max return counter has met a threshold value in step 46, the system next moves to step 48 in which the stabilization timer is reset and a reconnect is performed in the original zone in step 50.

The above ensures that if the system returns to the original zone a certain number of times then it will perform a reconnect regardless of whether the zone has stabilized. This will optimize the probability that connectivity is maintained.

From step 50 the system next moves to step 52 in which the max return counter is initialized again for the next time that a zone change occurs for the mobile device.

If, in step 18, the system finds that the stabilization period is over, the system next moves to step 20 in which it checks whether the device is in a new zone. If in step 20 it is found that the device is in the original zone, then no reconnection is necessary and the system moves to step 24. Conversely, if the system finds that it is not in the original zone in step 20, then a reconnect is performed in the new zone in step 22. From steps 22 and 24, the system moves to step 52 to initialize the max return counter for the next time the mobile device moves to a new zone.

Figure 4:
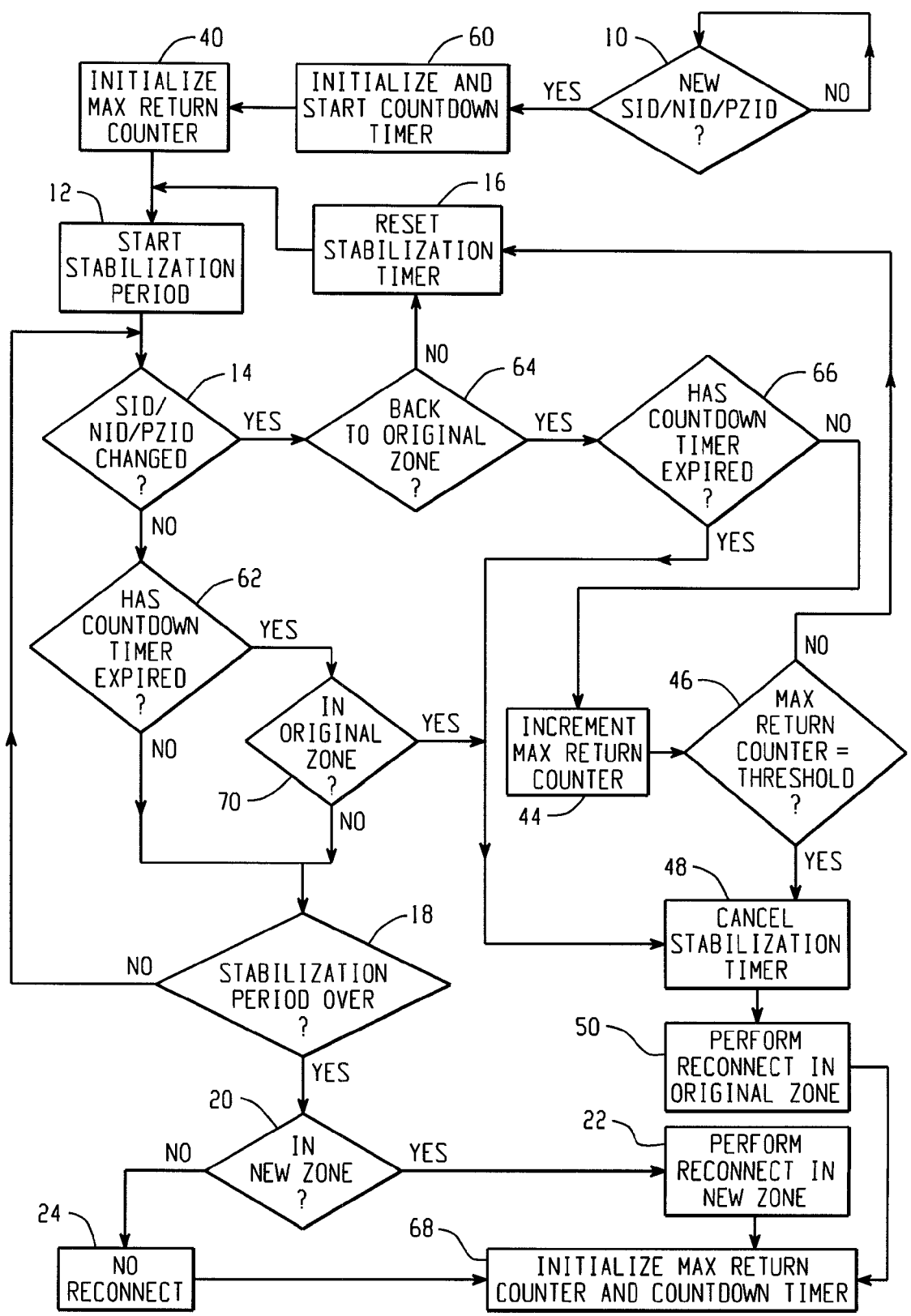
FIG. 4 is a flow diagram of a further embodiment of the present invention in which a countdown timer has been added.

In order to further improve the probability of maintaining data connectivity in any situation as described above, the mobile device could further make use of a countdown timer to achieve optimal connectivity. The countdown timer would be used to ensure that if a mobile device has not stabilized within a certain time period and enters back into the original zone where it previously had been, it will perform a reconnect in that original zone regardless of whether it has stabilized within the zone. The advantage is that the device will only be out of connection within the original zone for a maximum time period. Reference is now made to FIG. 4.

In FIG. 4, the system waits in step 10 for a new SID/NID/PZID to indicate that it has changed zones. If it has not changed zones, the system stays within step 10.

If the system finds that it has changed zones, the system next moves to step 60. In step 60 a countdown timer is initialized and started.

As illustrated in FIG. 4, both the countdown timer and the max return counter are used to optimize connectivity. However, as one skilled in the art will appreciate, the max return counter and the countdown timer can be used independently of each other by removing the steps associated with the max return counter from the embodiment of FIG. 4.

Once the countdown timer is initialized and started in step 60, the system next moves to step 40. In step 40 the max return counter is initialized and the system next moves to step 12. In step 12 the stabilization period is started by starting a stabilization timer.

The system next moves to step 14 in which it checks whether or not the zone has changed again. If the zone has not changed, the system next checks in step 62 whether the countdown timer has expired. If the countdown timer has not expired, the system next moves to step 18 in which it checks whether or not the stabilization period is over. If the stabilization period has not ended, the system repeats steps 14, 62 and 18 as long as the answers in each of these steps is no.

If in step 14 the system finds that the zone has changed by having a new SID, NID or PZID, the system next moves to step 64. In step 64, the system checks whether it is back in the original zone. This is important since the countdown timer is only relevant to the original zone that the device was in.

If in step 64 the system finds that it is not in the original zone, the system moves to step 16 in which the stabilization timer is reset and moves back to step 12 in which the stabilization period is started over again. This is because the zone has changed but to a new zone, thus requiring the stabilization period to restart without incrementing the max return counter.

Conversely, if the system finds in step 64 that it is back in the original zone, then the system performs step 66 in which it checks whether the countdown timer has expired.

If the countdown timer in step 66 has not expired, the system moves to step 44 in which the max return counter is incremented and in step 46 checks whether the max return counter has reached its threshold. If the max reset counter has not reached its threshold, the system moves to step 16 and then to step 12 to reset the stabilization timer and start the stabilization period over again.

If the max return counter has reached its threshold, then the system moves to step 48 in which the stabilization counter is cancelled and in step 50 a reconnect is performed in the original zone.

In step 66, if the countdown timer has expired then the system realizes that both the countdown timer has expired and the system is in the original zone and further realizes that this is a precondition to perform a reconnect regardless of whether stabilization has been achieved. The system therefore moves to step 48 if the countdown timer has expired in step 66. Step 48 cancels the stabilization timer and moves to step 50 in which a reconnect is performed in the original zone.

The system further after step 50 moves to step 68 in which the max return counter and the countdown timer are both initialized.

As one skilled in the art will appreciate, if the countdown timer expires while the system is in the original zone then a reconnection is necessary but not captured in the steps above. In step 62 the system is in a state in which the zone has not changed as found in step 14. However, if the countdown timer has expired, the system moves to step 70 in which it checks whether or not the system is back in the original zone. If the system is back in the original zone, it realizes that both the countdown timer has expired and that it is in the original zone and therefore the system moves to step 48 in which the stabilization timer is cancelled and further to step 50 in which a reconnect is performed in the original zone.

Conversely, if the system is not in the original zone in step 70, then regardless of whether the countdown timer has expired, the system still needs to achieve stabilization and the system moves back to step 18 in which it checks whether or not the stabilization period is over.

If the stabilization period is over in step 18, the system next moves to step 20 in which it checks whether the system is in a new zone. If the system is not in a new zone, then it is back in the original zone and no reconnection is necessary and the system moves to step 24. If the system is in a new zone in step 20 then the system is stable in this new zone and a reconnection is required in this new zone, in which case the system moves to step 22 in which a reconnection is performed in this new zone.

After both steps 22 and 24, the max return counter and the countdown timer both need to be initialized again.

As one skilled in the art will realize, in the embodiments of FIGS. 3 and 4 a timer restart counter as illustrated in the embodiment of FIG. 2 can further be added to ensure that the system is not perpetually within an unstable state. This may happen, for example, in the embodiment of FIG. 4 when the system does not return back to the original zone but is instead bouncing between two other zones. In this case, it is desirable to add a maximum restart counter to ensure that the device eventually performs a reconnection in a new zone and that it does not perpetually stay in a disconnected state.

The above described embodiments of the present invention are meant to be illustrative of preferred embodiments and are not intended to limit the scope of the present invention. Also, various modifications, which would be readily apparent to one skilled in the art, are intended to be within the scope of the present invention. The only limitations to the scope of the present invention are set forth in the following claims.

We claim:

1. A method of reconnecting a point to point protocol link layer in a mobile device comprising the steps of:
    monitoring whether the mobile device has entered a new zone from an original zone;
    after the monitoring step has determined that the mobile device has entered a new zone, starting a stabilization period;
    checking whether the mobile device changes zones during the stabilization period;
    if the mobile device changes zones during the stabilization period, then restarting the stabilization period and performing said checking step; and
    after the stabilization period ends, determining whether the mobile device is in said original zone, and if the mobile device is not in said original zone, then performing reconnection of the point to point protocol link layer to the current zone,
    wherein the steps of the method are executed by the mobile device.

2. The method of claim 1, wherein said monitoring step looks for a change in a system identifier.

3. The method of claim 1, wherein said monitoring step looks for a change in a network identifier.

4. The method of claim 1, wherein said monitoring step looks for a change in a packet zone identifier.

5. The method of claim 1, wherein said starting step includes setting a stabilization timer.

6. The method of claim 5, wherein the duration of said stabilization timer is less than one minute.

7. The method of claim 5, wherein the duration of said stabilization timer is more than one minute.

8. A method reconnecting a point to point protocol link layer in a mobile device comprising the steps of:
    monitoring whether the mobile device has entered a new zone from an original zone;
    after said monitoring step has determined that the mobile device has entered a new zone, initializing a max return counter;
    starting a stabilization period;
    checking whether the mobile device changes zones during the stabilization period;
    if the mobile device changes zones during the stabilization period and returns to said original zone, then incrementing the max return counter and determining whether the max return counter has reached a threshold level, and if said max return counter has reached said threshold level, performing reconnection of the point to point protocol link layer to said original zone, and if said max return counter has not reached said threshold level, then restarting the stabilization period and returning to said checking step;
    if the mobile device changes zones during the stabilization period and does not return to said original zone, then restarting the stabilization period and returning to said checking step; and
    after the stabilization period ends, determining whether the mobile device is in said original zone, and if the mobile device is not in said original zone, performing reconnection of the point to point protocol link layer to the current zone;
    wherein the steps of the method are executed by the mobile device.

9. The method of claim 8, wherein said monitoring step looks for a change in a network identifier.

10. The method of claim 8, wherein said monitoring step looks for a change in a packet zone identifier.

11. The method of claim 8, wherein said starting step includes setting a stabilization timer.

12. The method of claim 11, wherein the duration of said stabilization timer is less than one minute.

13. The method of claim 11, wherein the duration of said stabilization timer is more than one minute.

14. The method of claim 8, wherein said method further comprises the steps of:
    initializing and starting a countdown timer after said monitoring steps finds the mobile device has entered a new zone;
    if the mobile device changes zones during the stabilization period and returns to the original zone, then determining whether said countdown timer has expired, and if said countdown timer has expired, canceling the stabilization period and performing a reconnection of the point to point protocol link layer to said original zone.

15. The method of claim 8, further comprising the steps of:
    initializing and starting a countdown timer after said monitoring steps finds the mobile device has entered a new zone;
    if said countdown timer expires during said stabilization period, then determining if the mobile device is in said original zone, and if said mobile device is in said original zone, then canceling said stabilization period and performing reconnection of the point to point protocol link layer to the original zone.

16. A method of reconnecting a point to point protocol link layer in a mobile device comprising the steps of:
    monitoring whether the mobile device has entered a new zone from an original zone;
    after said monitoring step has determined that the mobile device has entered a new zone, initializing and starting a countdown timer;
    starting a stabilization period;
    checking whether the mobile device changes zones during the stabilization period;
    if the mobile device changes zones during the stabilization period and returns to said original zone, then determining whether said countdown timer has expired, and if said countdown timer has expired performing reconnection of the point to point protocol link layer to said original zone;
    if the mobile device changes zones during the stabilization period and does not return to said original zone, then restarting the stabilization period and returning to said checking step; and
    after if the stabilization period ends, determining whether the mobile device is in said original zone, and if the mobile device is not in said original zone, performing reconnection of the point to point protocol link layer to the current;
    wherein the steps of the method are executed by the mobile device.

17. The method of claim 16, further comprising the steps of:
    if said countdown timer expires during the stabilization period, then determining whether said mobile device is in said original zone, and if said mobile device is in said original zone, canceling said stabilization period and performing reconnection of the point to point protocol link layer to the original zone.

18. The method of claim 16, wherein said monitoring step looks for a change in a network identifier.

19. The method of claim 16, wherein said monitoring step looks for a change in a packet zone identifier.

20. The method of claim 16, wherein said starting step includes setting a stabilization timer.

21. The method of claim 20, wherein the duration of said stabilization timer is less than one minute.

22. The method of claim 20, wherein the duration of said stabilization timer is more than one minute.

* * * * *

UNITED STATES PATENT AND TRADEMARK OFFICE
CERTIFICATE OF CORRECTION

| | | |
|---|---|---|
| PATENT NO. | : 7,835,335 B2 | Page 1 of 1 |
| APPLICATION NO. | : 12/435765 | |
| DATED | : November 16, 2010 | |
| INVENTOR(S) | : Hossain et al. | |

It is certified that error appears in the above-identified patent and that said Letters Patent is hereby corrected as shown below:

Column 7, line 42, please replace "A method reconnecting" with -- A method of reconnecting --

Column 8, line 57, please replace "after if the" with -- after the --

Column 8, line 61, please replace "the current;" with -- the current zone; --

Signed and Sealed this
Twenty-second Day of February, 2011

David J. Kappos
*Director of the United States Patent and Trademark Office*